Jan. 17, 1950     R. B. DE LANO, JR     2,494,990
METHOD AND MEANS FOR LOCATING DISCONTINUITIES
BY PULSES OF RADIANT ENERGY
Filed June 27, 1947     2 Sheets-Sheet 1

INVENTOR.
RALPH B. DE LANO JR.
BY
ATTORNEY

Jan. 17, 1950　　　　R. B. DE LANO, JR　　　　2,494,990
METHOD AND MEANS FOR LOCATING DISCONTINUITIES
BY PULSES OF RADIANT ENERGY
Filed June 27, 1947　　　　　　　　　2 Sheets-Sheet 2

INVENTOR.
RALPH B. DE LANO JR.
BY
Joseph H. Lipschutz
ATTORNEY

Patented Jan. 17, 1950

2,494,990

UNITED STATES PATENT OFFICE 2,494,990

METHOD AND MEANS FOR LOCATING DISCONTINUITIES BY PULSES OF RADIANT ENERGY

Ralph B. De Lano, Jr., New York, N. Y., assignor to Sperry Products, Inc., Hoboken, N. J., a corporation of New York Application June 27, 1947, Serial No. 757,518

4 Claims. (Cl. 343—13)

This invention relates to the art of detecting the presence of reflecting surfaces by causing a high frequency pulse or wave train to be transmitted and measuring the time interval between the transmission of the pulse and the receipt of the pulse reflection from a reflecting surface. One application of this method is employed in the supersonic inspection of materials wherein periodic supersonic wave trains are transmitted into the material through one face thereof and the time interval between sending of the pulse and reception of the reflection of the pulse from the opposite side of the material, or from an intervening reflecting surface such as an internal defect, is measured. This system is disclosed in the patent to F. A. Firestone No. 2,280,226, granted April 21, 1942.

The invention relates more particularly to the type of device described above wherein an indicator other than an oscilloscope is employed. Where an oscilloscope is employed the distance between indication on the sweep of the transmitted pulse and the reflection from an internal defect is an indication of the distance of the defect below the surface. In the case where flaw indications are indicated by meters such distance indication is not disclosed and it may nevertheless be desired to know not merely whether or not a defect is present in the material under test but also how far beneath the transmitting surface the defect is located.

This invention has for its principal object therefore the provision in a supersonic inspection system wherein a meter is employed for indicating the presence of defects, and means whereby the location of the defect beneath the transmitting surface of the object may be determined.

Further objects and advantages of this invention will become apparent in the following detailed description thereof.

In the accompanying drawings.

Figure 1:
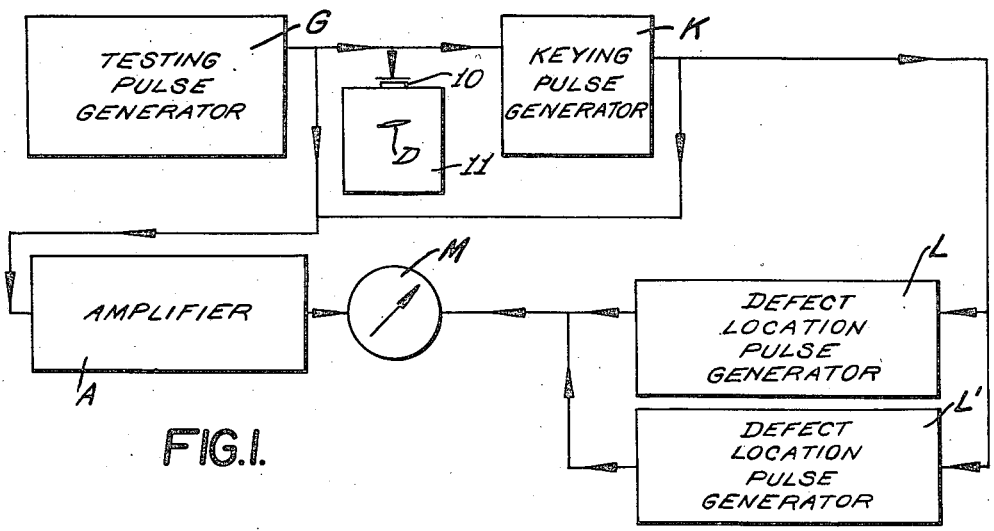
Fig. 1 is a block diagram showing the general arrangement of one embodiment of this invention as applied to the supersonic inspection of a solid material for internal defects.
Figure 2:
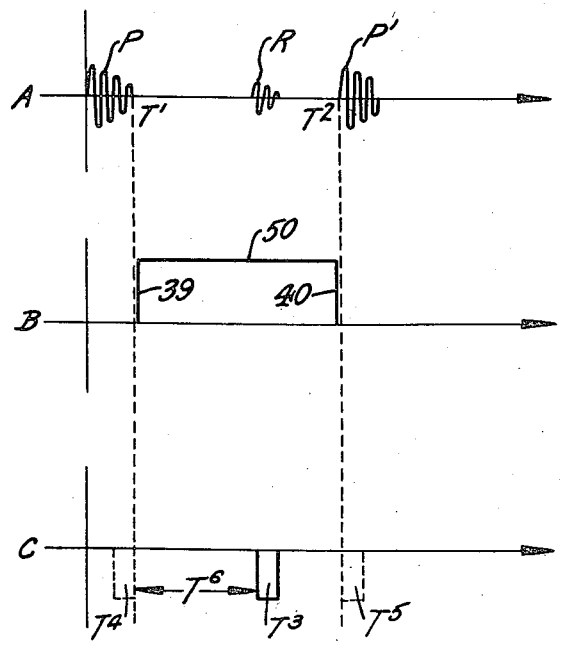
Fig. 2 is a series of graphs illustrating the principles embodied in the Fig. 1 arrangement.

Referring first to Figs. 1 and 2 the general principles of this invention are disclosed therein. In accordance with the practice set forth in the said Firestone patent a testing pulse generator G periodically generates a wave train or pulse which is applied to a piezo-electric element which may be a quartz crystal 10 in contact with a block of material 11 which it is desired to inspect for possible internal defects such as the fissure D. The wave train will penetrate the object 11 and on striking the reflecting surface D will be reflected to the crystal 10 which will convert the vibrations into electrical wave trains. The pulse continues to travel to the opposite surface of object 11 and will be reflected thereby so that eventually the reflection will be received by the crystal 10. The test pulse when applied to crystal 10 is also applied to an amplifier A. The reflections which generate electric voltages in crystal 10 will also be applied to amplifier A and if the output of amplifier A were caused to modify the horizontal sweep of an oscilloscope there would be obtained indications on the scope similar to those shown in graph 2A in which the original pulses generated by generator G is indicated at P, the reflection from the defect is indicated at R, and the reflection of the pulse from the opposite surface is indicated at P'. The distance between P and R would in an oscilloscope give an indication of the depth of the defect D below the surface since the distance between P and R represents a time interval on the sweep and hence represents the time it takes the wave train to travel from the transmitting surface of object 11 to defect D and back to the crystal.

However, as stated in the introduction hereto this indication of distance of defect below the surface is not available in this instance where, as in this case, the defect is indicated on a meter M. This invention therefore provides means whereby in a system employing a meter the distance of the defect below the surface may nevertheless be indicated. For this purpose there is provided, first, means for eliminating from the input to meter M the indications P and P' representing the transmitted pulse and the reflection of the transmitted pulse from the opposite surface of object 11. In other words the meter indicating system is rendered effective from a time T' when the transmitted pulse ends and remains effective until a time $T^2$ just before the receipt by the crystal of the reflection of the pulse from the opposite surface of the object under test. Therefore, any indication which is indicated by the meter must necessarily be that of a reflection from a reflecting surface within the object 11 from a point just below the entering surface to a point just above the opposite surface. Therefore every indication by the meter M will necessarily be that of an internal defect.

With the indications of the initial pulse and the reflection of the initial pulse from the opposite side of the object eliminated the meter will indicate defects within the object but will give no indication as to the location of the defect beneath the crystal 10, i. e., the entering surface of the object. In order to obtain such indication I provide means for successively blocking out small intervals of the period of time during which the meter is effective. Thus, if the time interval indicated at $T^3$ in graph Fig. 2C is progressively shifted to scan the entire period during which the meter M is effective as for instance from position $T^4$ until position $T^5$, then when the blocked out period reaches the position of defect R, the meter M which has been indicating the presence of the reflection R caused by the defect will cease to indicate such defect and thus the operator will know that the defect is below the entering surface of object 10 a distance such that it requires the time interval $T^6$ to travel. If this time interval $T^6$ necessary to block out the indications of the defect on the meter can be determined then a measure of depth of defect below the surface can be obtained.

Figure 3:
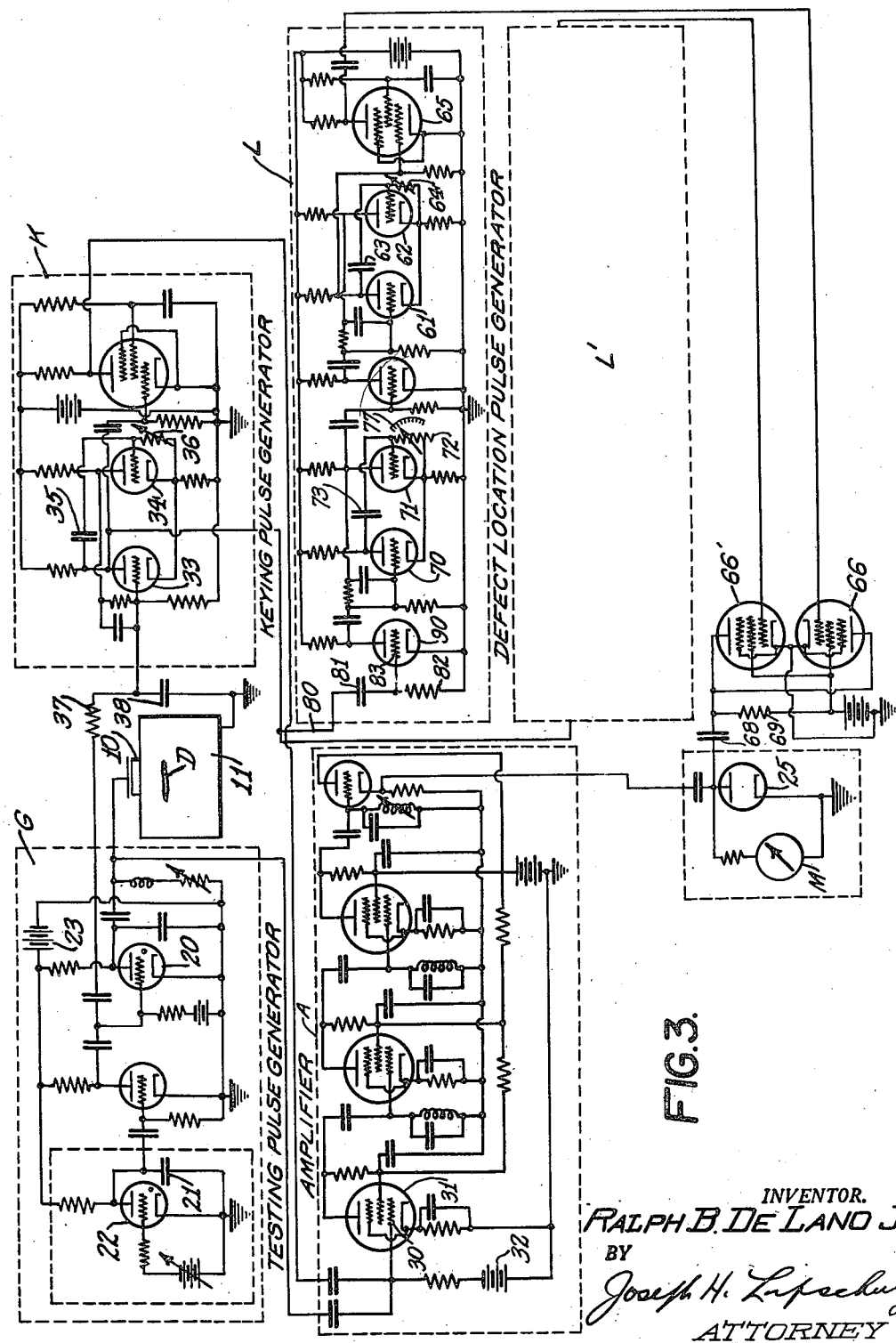
Fig. 3 is a wiring diagram disclosing the details of the block elements of Fig. 1.

Fig. 1 shows in block diagram an arrangement for performing the above-described functions and Fig. 3 shows the detailed mechanism for accomplishing these functions. Referring to Fig. 3 there is shown a testing pulse generator G which may be of any known type such as, for instance, that disclosed in the said Firestone patent or the one disclosed in my copending application Serial No. 641,706, filed January 17, 1946. Such generators include a gaseous discharge tube 20 which is caused to discharge periodically by the charging and discharge of condenser 21 through gas tube 22. The condenser 21 is charged from any suitable source such as battery 23. The pulse from generator G is applied to piezo-electric crystal 10 in contact with the transmitting surface of object 11 to generate a pulse shown at P in Fig. 2A. The pulse travels through object 11 and is reflected by defect D as well as by the opposite surface of object 11. These reflections yield the pulses R and P' issuing from crystal 10 and are applied to the amplifier A as shown in Fig. 1. The output of amplifier A is caused to operate meter M by placing a positive charge on diode tube 25. Ordinarily all three pulses P, R and P' would pass through the amplifier and all would actuate the meter, but if pulses P and P' actuated the meter it would be impossible to distinguish the indication due to the pulse R which indicates a defect.

Accordingly, means are provided whereby there will be no output from the amplifier in response to pulses P and P' and this is effected by the keying pulse generator K. For this purpose the output from pulse generator G and the pulses from crystal 10 are received on grid 30 of tube 31 in amplifier A. This grid, however, carries a strong negative bias supplied from a source such as battery 32, sufficient to render the amplifier A ineffective in spite of the positive pulses placed on grid 30 by the pulses from generator G and by the pulses from crystal 10. It is not until keying pulse generator K generates a pulse sufficiently substantial to neutralize the negative bias on grid 30 that the pulse arriving at grid 30 from the crystal 10 will be transmitted through the amplifier A to the meter M. The keying pulse generator K comprises a flip-flop circuit consisting of tubes 33 and 34 and associated resistor and capacitors designed to generate a pulse whose length may be determined by capacitor 35 and resistor 36 one of which (in this case resistor 36) may be made adjustable to vary the length of the pulse generated by generator K. The generator K is keyed by the pulse from generator G by way of resistor 37 and capacitor 38 so that there will be a time lag in the generation of the pulse by generator K relative to the end of the pulse by generator G. This time lag is so adjusted that the leading edge 39 (see Fig. 2B) of the pulse K occurs at the end of the generation of pulse P by generator G. Resistor 36 is adjusted so that the final edge 40 of the pulse generated by K will occur just before the receipt of reflections of the opposite surface of object 11 by the crystal 10. Since the keying pulse 50 generated by K renders the amplifier A effective it will be seen that amplifier A will be effective from a time T' to time $T^2$, i. e., from a time just after pulse P ends to a time just before pulse P' is received by crystal 10 and thus only reflections received between these times corresponding to defects within the object will be indicated.

Thus any indication of the meter M will be an indication of a defect. Since the generator G transmits the pulses periodically, the reflection pulses will be periodically impressed on crystal 10 and hence the meter will be periodically actuated, and since these periodic actuations occur in rapid succession the meter will hold its indication as long as the crystal 10 is in the same position relative to the defect. This, however, while indicating the presence of a defect gives no clue as to the location of the defect relative to the surface through which the pulse is transmitted. In other words it gives no indication of the depth of the defect beneath the transmitted surface. To obtain such indication I employ a defect location pulse generator L which is designed to generate a pulse of short duration (on the order of 8 microseconds) which will render the meter ineffective for this brief period $T^3$. Furthermore, I provide for effecting this blocking out of the meter M for the interval $T^3$ at progressive points throughout the period 50 of the keying pulse. When the blocking interval $T^3$ reaches the interval during which the reflection R is being received from the defect, obviously the meter will cease to indicate because it is ineffective at this moment. If therefore the interval of time $T^6$ and T' is known this will be a function of the depth of defect beneath the transmitting surface.

For generating the blocking pulse $T^3$ there may be provided a flip-flop circuit comprising tubes 61 and 62 with associated capacitor 63 and resistor 64 one of which (in this case resistor 64) is made adjustable to vary the duration (i. e., the width) of the blocking pulse $T^3$. After being amplified by amplifying tube 65 and tube 66 the pulse appears across resistor 67 as a negative pulse and will (since it passes through capacitor 68) bias diode 25 and prevent it from conducting during this time interval.

For enabling the time $T^6$ to be varied between limits T' and $T^2$ the flip-flop circuit, 61, 62 is controlled from another flip-flop circuit including tubes 70 and 71 resistor 72 and capacitor 73. Either the capacitor or resistor may be made adjustable, and in this case the resistor is indicated as the adjustable element. It is this adjustment which varies the time $T^6$ between the limits T' and $T^2$ and therefore the movable arm of the adjustable resistor 72 may be caused to indicate directly on a scale 71 distance beneath the transmitting surface of object 11 less the distance represented by T'. T' is the length of the pulse and is normally fixed. The flip-flop circuit 70, 71 may be controlled from the keying pulse generator K so that the beginning of time interval T⁶ will correspond to the beginning 39 of pulse 50. For this purpose the pulse from generator K may be led by conductor 80 to capacitor 81 and resistor 82 which are so proportioned as to differentiate the leading edge 39 of the keying pulse and apply a sharp negative pulse to the grid 83 of tube 90. This pulse is then applied to the flip-flop circuit 70, 71.

In order that more than one defect may be located at one time, one or more additional defect location pulse generators L' may be employed. This pulse generator is the same as pulse generator L and an additional tube 66' is provided so that the two pulses may be mixed across resistor 67 and thence across diode 65.

Having described my invention, what I claim and desire to secure by Letters Patent is:

1. In a wave train sending and receiving system, a transmitter for transmitting a wave train into a medium to be inspected, a receiver for receiving reflections of the wave train from reflecting surfaces in the medium, an indicator actuated by said receiver, means tending to render the indicator effective throughout a period commencing at a predetermined time following the transmission of the wave train and ending a predetermined time before receipt of reflections of the wave train from a predetermined point in the medium, means for rendering said first means ineffective during said period for a relatively short predetermined time whereby the indicating means is effective before and after said predetermined time, and means for varying the time delay in rendering said second means effective after said first means is rendered effective.

2. In a system for the supersonic inspection of an object, a transmitter for transmitting a wave train into the object through one surface thereof, a receiver for receiving reflections of the wave train, an indicator actuated by said receiver, means tending to render the indicator effective throughout a period commencing at a predetermined time following the transmission of the wave train and ending a predetermined time before receipt of reflections of the wave train from the opposite surface of the object, means for rendering said first means ineffective during said period for a relatively short predetermined time whereby the indicating means is effective before and after said predetermined time, and means for varying the time delay in rendering said second means effective after said first means is rendered effective.

3. In a wave train sending and receiving system, a transmitter for transmitting a wave train into a medium to be inspected, a receiver for receiving reflections of the wave train from reflecting surfaces in the medium, an amplifier for amplifying the received wave trains, an indicator actuated by the output of said amplifier, means tending to render the amplifier effective throughout a period commencing at a predetermined time following the transmission of the wave train and ending a predetermined time before receipt of reflections of the wave train from a predetermined point in the medium, means for rendering said indicator ineffective during said period for a relatively short predetermined time whereby the indicating means is effective before and after said predetermined time, and means for varying the time delay in rendering said indicator ineffective after said amplifier is rendered effective.

4. In a system for the supersonic inspection of an object, a transmitter for transmitting a wave train into the object through one surface thereof, a receiver for receiving reflections of the wave train, an amplifier for amplifying the received wave trains, an indicator actuated by the output of said amplifier, means tending to render the amplifier effective throughout a period commencing at a predetermined time following the transmission of the wave train and ending a predetermined time before receipt of reflections of the wave train from the opposite surface of the object, means for rendering said indicator ineffective during said period for a relatively short predetermined time whereby the indicating means is effective before and after said predetermined time, and means for varying the time delay in rendering said indicator ineffective after said amplifier is rendered effective.

RALPH B. DE LANO, Jr.

REFERENCES CITED

The following references are of record in the file of this patent:

UNITED STATES PATENTS

| Number | Name | Date |
| --- | --- | --- |
| 2,280,226 | Firestone | Apr. 21, 1942 |
| 2,403,527 | Hershberger | July 9, 1946 |